US006522894B1

United States Patent
Schmidt

(10) Patent No.: US 6,522,894 B1
(45) Date of Patent: Feb. 18, 2003

(54) SIMPLIFIED SPEAKER MODE SELECTION FOR WIRELESS COMMUNICATIONS DEVICE

(75) Inventor: Paul E. Schmidt, Forest, VA (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/361,941

(22) Filed: Jul. 27, 1999

(51) Int. Cl.[7] ................................................ H04Q 7/32
(52) U.S. Cl. ........................ 455/552; 455/569; 455/575
(58) Field of Search ................................. 455/552, 553, 455/557, 566, 569, 575, 550

(56) References Cited

U.S. PATENT DOCUMENTS

| 5,179,721 A | * | 1/1993 | Comroe et al. | 455/552 X |
| 5,450,618 A | * | 9/1995 | Naddell et al. | 455/575 |
| 5,749,056 A | * | 5/1998 | Patterson et al. | 455/569 |
| 5,881,370 A | * | 3/1999 | Pottala et al. | 455/552 X |
| 5,884,156 A | * | 3/1999 | Gordon | 455/552 X |

* cited by examiner

Primary Examiner—William Trost
Assistant Examiner—Philip J. Sobutka
(74) Attorney, Agent, or Firm—Coats & Bennett, P.L.L.C.

(57) ABSTRACT

A simplified method of controlling the operating mode of a wireless communications device, particularly the speaker mode, includes operating a wireless communications device according to a selected default mode. The method of audio output, such as through a loud speaker or through a quieter speaker, is determined, at least in part by the default mode setting. The device includes at least a first key and a second key. Pressing the first key causes the device to automatically initiate a call session in radio mode and stay in radio mode until the end of the call session. On the other hand, pressing the second key causes the device to automatically initiate a call session in phone mode and stay in phone mode until the end of the call session. In either case, the wireless communications device reverts to the default mode when the call session ends. By doing so, the user is provided with a simple method for temporarily switching to the desired mode of operation, without the necessity of first determining the current mode of the wireless communications device and through the simple press of a single key. This method is particularly adapted for use with wireless communications devices having two separate speakers, a quiet one for phone mode and a louder one for radio mode.

20 Claims, 3 Drawing Sheets

SIMPLIFIED SPEAKER MODE SELECTION FOR WIRELESS COMMUNICATIONS DEVICE

FIELD OF THE INVENTION

The present invention relates to the field of portable wireless communications devices, and more particularly to a method of operating mode selection in portable wireless communications devices.

BACKGROUND OF THE INVENTION

The use of portable wireless communications devices, such as cellular phones, personal communications assistants, and the like, is rapidly increasing throughout society. As their use has spread, so have demands for increased functionality, with resultant increase in the complexity of such devices.

Using a cellular phone as an example, these devices attempt to mimic traditional landline telephones, but typically with additional functionality, such as portability. One very desirable aspect of most cellular phones is the ability to engage in full duplex communications. In the typical one-on-one conversation, full duplex operation allows both parties to simultaneously speak, as contrasted with the old prior art of mobile trunked-radio phones which allow only one party to speak at a time. In addition, with conference call or other multi-party capability, more than two parties can talk simultaneously. For ease of reference, this full duplex mode of operation will be referred to as "phone mode" The details of phone mode operation in cellular phones are well known in the art.

Some cellular phones are not only capable of operating in phone mode, but also in what will be referred to herein as radio mode. Examples of such devices may be seen in U.S. Pat. No. 5,450,618, which is incorporated herein by reference, and U.K. Patent Application GB2269721. In radio mode, the phone appears to the user to handle communications in a half-duplex manner. That is, the cellular phone does not appear to the user as simultaneously transmitting and receiving voice data. Instead, the user must push a button known as a push-to-talk (PTT) button in order to include data corresponding to the user's voice in the data transmitted; otherwise, the phone appears to the user as if it is receiving only. The systems and general operations associated with phones using radio mode also well known in the art.

Cellular phones designed to operate in both phone mode and radio mode typically include two distinct speakers for audio output. In phone mode, the audio output, based on the communications signals exchanged with a remote location, are output via a low volume speaker, typically located on the phone body at the opposite end from the phone's microphone. Thus, in phone mode, the low volume speaker is typically proximate the user's ear while the microphone is proximate the user's mouth. This low volume speaker typically has a variable volume audio output that may be controlled by dials or other known means. However, the output of the low volume speaker is typically limited to a maximum allowed volume that will not damage a typical user's hearing even at the highest setting. For radio mode, the phone uses a different high volume speaker, typically located proximate the microphone end of the phone. This high volume speaker also typically has variable volume; however, the maximum allowed audio volume for this speaker it typically much higher than that of the low volume speaker. The higher allowed audio volume is required for the phone's output to be heard when the phone is not proximate the user's head, such as for receiving a page while the phone is clipped to a user's belt. The phone in U.S. Pat. No. 5,450,618 has this arrangement.

One problem with phones that can operate in both phone mode and radio mode is switching between modes. Typically, if a user wants to place a call in radio mode, the user must first determine the current mode of the phone. Assuming that the phone is in phone mode, the user must press a mode selection button to toggle the mode, press the PTT button to originate the call, and then at call release, press the mode selection button to return the phone back to phone mode. This is a cumbersome procedure that many users fail to fully complete, thereby leading to less than satisfactory performance. A similar procedure must be used to place a call in phone mode when the phone is in radio mode.

Thus, there remains a need for a simplified method of selecting the mode of the phone, and particularly the speaker to be used. Such a method should cause the wireless communications device to automatically return to its default operating mode when the call is complete while also requiring a minimum of key press operations to switch modes.

SUMMARY OF THE INVENTION

The present invention provides a simplified method of controlling the operating mode of a wireless communications device, particularly the speaker mode. The wireless communications device operates according to a selected default mode and handles incoming messages according to that mode. In particular, the method of audio output, such as through a loud speaker or through a quieter speaker, is determined, at least in part, by the default mode setting.

One preferred embodiment of the wireless communications device includes at least a first key and a second key. When initiating an outgoing call, pressing the first key causes the wireless communications device to initiate a call session in radio mode and stay in radio mode until the end of the call session, unless changed by a user. On the other hand, pressing the second key causes the wireless communications device to initiate a call session in phone mode and stay in phone mode until the end of the call session, unless changed by a user. In either case, the wireless communications device reverts to the default mode when the call session ends. The present invention provides the user with a simple method for temporarily hot-switching to the desired mode of operation, without the necessity of first determining the current mode of the wireless communications device. Thus, rather than having to navigate a complex menu system or press multiple keys, the user may temporarily change operating modes of the wireless communications device through the simple press of a single key. While this method is operative with wireless communications devices having a single multiple-mode speaker, the method is particularly adapted for use with wireless communications devices having two separate speakers, a quiet one for phone mode and a louder one for radio mode.

DETAILED DESCRIPTION

Figure 1:
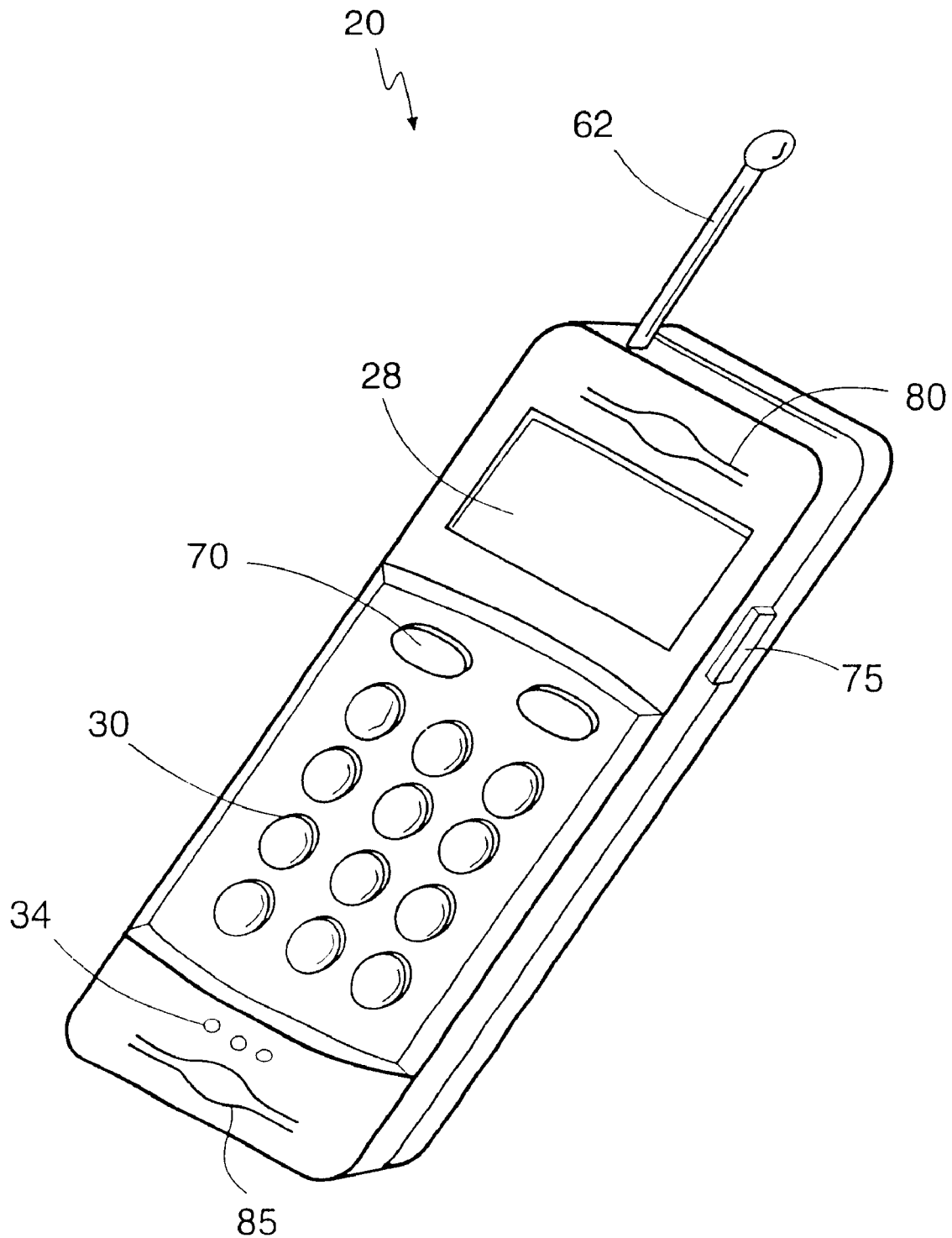
FIG. 1 is perspective view of one embodiment of a wireless communications device according to the present invention.
Figure 2:
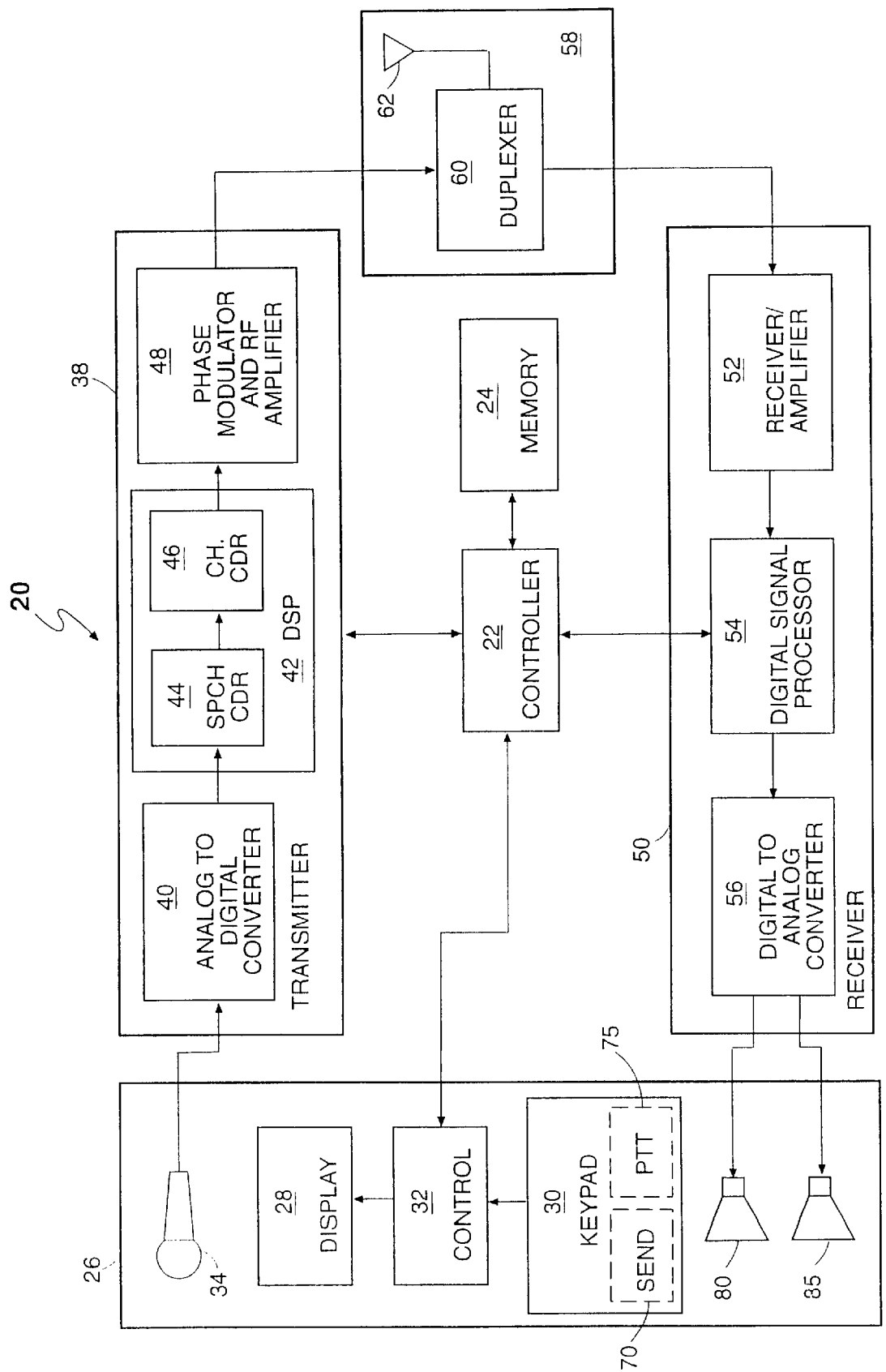
FIG. 2 is a schematic representing the wireless communications device of FIG. 1.
Figure 3:
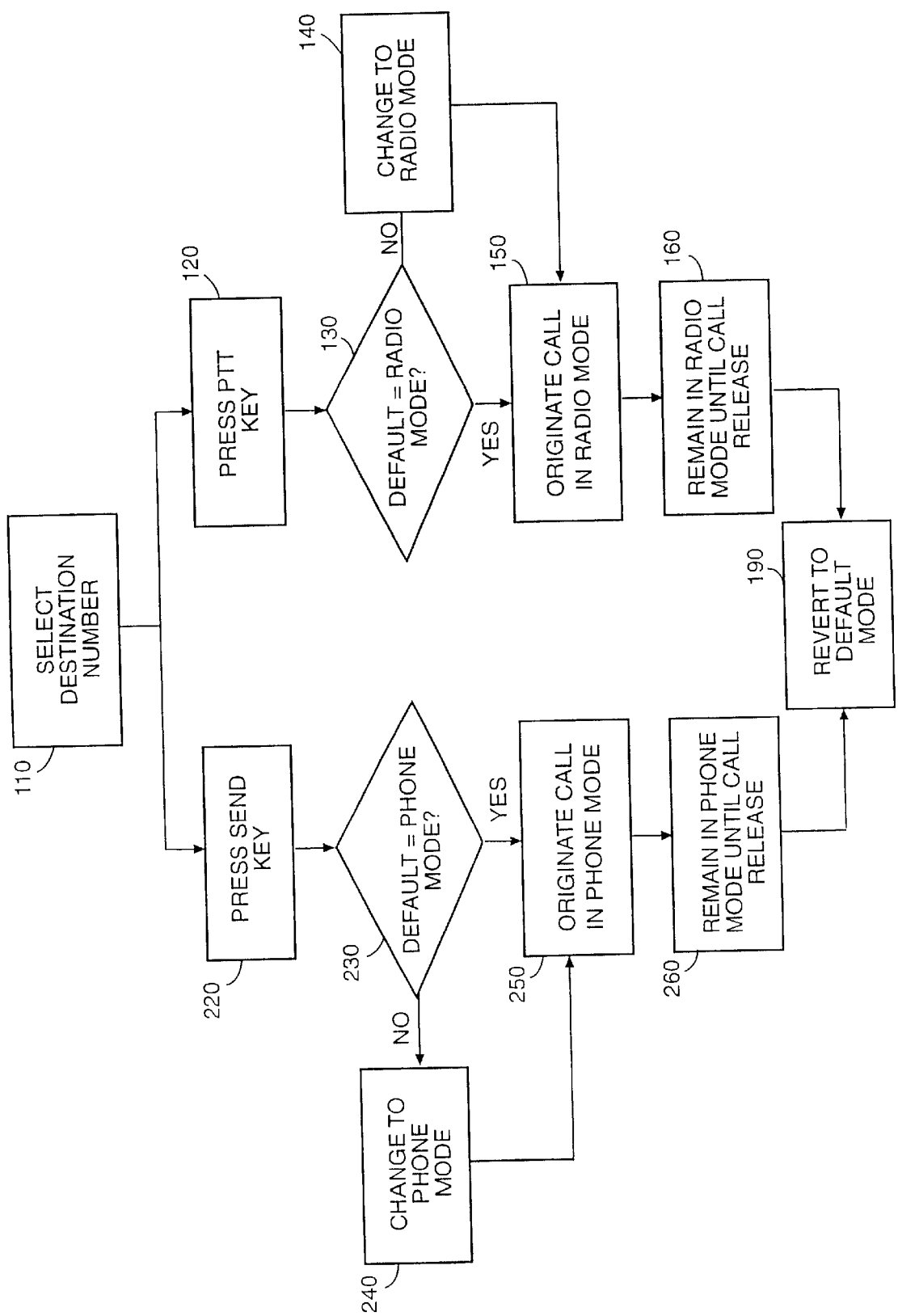
FIG. 3 is a simplified flow chart showing the process flow of one temporary mode selection method of the present invention.

One preferred embodiment of a wireless communications device 20 of the present invention is shown in FIGS. 1 and 2. For clarity of illustration, a cellular telephone capable of transmitting and receiving digital signals will be used as an example of a wireless communications device 20 in the following discussion, but the invention is not so limited. Indeed, the present invention may apply to any wireless communications device 20, including cellular telephones, personal communications assistants, and so forth, whether using analog or digital communications.

The cellular telephone 20 typically includes a controller 22, an operator interface 26, a transmitter 38, a receiver 50, and an antenna assembly 58. The operator interface 26 typically includes a display 28, keypad 30, control unit 32, microphone 34, and two speakers 80,85. The display 28 allows the operator to see dialed digits, call status, and other service information. The keypad 30 allows the operator to dial numbers, enter commands, and select options. The control unit 32 interfaces the display 28 and keypad 30 with the controller 22. The microphone 34 receives acoustic signals from the user and converts the acoustic signals to an analog electrical signal. Speakers 80,85 convert analog electrical signals from the receiver 50 to acoustic signals which can be heard by the user. As necessary, there may be a switch (not shown) disposed in the circuit path leading to the speakers 80,85 for limiting the audio output to one speaker or the other. Such a switch should operate under the control of the controller 22, either directly or indirectly.

The analog electrical signal from the microphone 34 is supplied to the transmitter 38. The transmitter 38 includes an analog to digital converter 40, a digital signal processor 42, and a phase modulator and RF amplifier 48. The analog to digital converter 40 changes the analog electrical signal from the microphone 34 into a digital signal. The digital signal is passed to the digital signal processor (DSP) 42, which contains a speech coder 44 and channel coder 46. The speech coder 44 compresses the digital signal and the channel coder 46 inserts error detection, error correction and signaling information. The DSP 42 may include, or may work in conjunction with, a DTMF tone generator (not shown). The compressed and encoded signal from the digital signal processor 42 is passed to the phase modulator and RF amplifier 48, which are shown as a combined unit in FIG. 2. The modulator converts the signal to a form, which is suitable for transmission on an RF carrier. The RF amplifier then boosts the output of the modulator for transmission via the antenna assembly 58.

The receiver 50 includes a receiver/amplifier 52, digital signal processor 54, and a digital to analog converter 56. Signals received by the antenna assembly 58 are passed to the receiver/amplifier 52, which shifts the frequency spectrum, and boosts the low-level RF signal to a level appropriate for input to the digital signal processor 54.

The digital signal processor 54 typically includes an equalizer to compensate for phase and amplitude distortions in the channel corrupted signal, a demodulator for extracting bit sequences from the received signal, and a detector for determining transmitted bits based on the extracted sequences. A channel decoder detects and corrects channel errors in the received signal. The channel decoder also includes logic for separating control and signaling data from speech data. Control and signaling data is passed to the controller 22. Speech data is processed by a speech decoder and passed to the digital to analog converter 56. The digital signal processor 54, may include, or may work in conjunction with, a DTMF tone detector (not shown).

The digital to analog converter 56 converts the speech data into an analog signal which is applied to one of the speakers 80,85 to generate acoustic signals which can be heard by the user, as described in more detail below.

The antenna assembly 58 is connected to the RF amplifier of the transmitter 38 and to the receiver/amplifier 52 of the receiver 50. The antenna assembly 58 typically includes a duplexer 60 and an antenna 62. The duplexer 60 permits full duplex communications over the antenna 62.

The controller 22 coordinates the operation of the transmitter 38 and the receiver 50, and may for instance take the form of a common microprocessor. This coordination includes power control, channel selection, timing, as well as a host of other functions. The controller 22 inserts signaling messages into the transmitted signals and extracts signaling messages from the received signals. The controller 22 responds to any base station commands contained in the signaling messages, and implements those commands. When the user enters commands via the keypad 30, the commands are transferred to the controller 22 for action. Memory 24 stores and supplies information at the direction of the controller 22 and preferably includes both volatile and non-volatile portions.

The keypad 30 includes a plurality of keys, including at least a first key 70 and a second key 75. For purposes of this illustration, the first key 70 is a send key and the second key is a PTT key. It is to be understood that the keys of the keypad 30 may be physical keys or virtual keys (such as shown on the display 28), and the keys do not need to be disposed on only one area of the phone 20. Indeed, it is preferred that the send key 70 be located some distance from the PTT key 75. For instance, the send key 70 may be proximate a common three by four telephone key array disposed on a front face of the phone 20 while the PTT key 75 may be located on the side of the phone 20, proximate the display 28. See FIG. 1.

The phone 20 also includes two speakers 80,85. The first speaker 80 is low volume speaker, typically located above the display 28 so as to be proximate the user's ear when the phone 20 is held next to the user's head in the traditional telephone handset orientation. The second speaker 85 is a high volume speaker typically located on the opposite end of the phone 20 from the low volume speaker 80. See FIG. 1. The low volume speaker 80 acts as the phone's primary speaker when the phone is in "phone mode," and the high volume speaker 85 acts as the phone's primary speaker in "radio mode," as discussed in more detail below.

After selection of the appropriate destination phone number, pressing (and then releasing) the send key 70 or the PTT key 75 begins a call session. A call session is a communications session between the phone 20 and a remote location, typically another phone 20. The call session begins with a call origination and ends with a call release. Pressing the send key 70 starts a call session in phone mode. Phone mode is simply a phone operational mode that is characterized by full duplex operation of the phone 20 in any manner well known in the art, such as according to ANSI-136. In phone mode, a conversation appears to the user of the phone 20 to be simultaneously bi-directional. This behavior is common in digital cellular phones of the prior art. The call session may be between the phone 20 and a single destination, or may optionally be between the phone 20 and a plurality of destinations, such as a conference call.

In contrast, pressing the PTT key 75 starts a call session in radio mode. Radio mode is a phone 20 operational mode wherein the phone 20 appears to the user to be operating in a half duplex mode. In radio mode, a conversation appears to the user of the phone 20 to be bi-directional, but not simultaneously. Instead, during the call session, the operation of the microphone 34 and the'speaker 85 are mutually exclusive. When the PTT key 75 is pushed, the microphone 34 of the phone 20 is active; when the PTT key 75 is not pushed, the speaker 85 is active. This type of operation is familiar to users of old fashioned trunked-radio phones. Thus, when in radio mode, the phone 20 mimics the man-machine interface of a trunked-radio phone. As in phone mode, the call session in radio mode may be between the phone 20 and a single destination, or may optionally be between the phone 20 and a plurality of destinations, such as a conference call.

Preferably, this radio mode behavior of the phone 20 is localized to the phone 20, meaning that the communications between the phone 20 and the remainder of the wireless communications system are as a digital cellular phone in phone mode, but the man-machine interface appears to the user to be like a trunked-radio phone. Thus, when the phone 20 is operating in radio mode, the phone 20 may appear to the remainder of the communications system as being either full duplex or half duplex. The only requirement on the phone operating in radio mode is that the phone 20 appear to the user as being half duplex, regardless of the reality as viewed from the perspective of the communications system. The radio mode operation of a phone 20 is further disclosed in co-owned U.S. patent application Ser. No. 09/234,191 which is incorporated herein by reference.

Importantly, when the phone 20 is in phone mode, the primary audio output from the phone 20 should be via the low volume speaker 80 and when the phone is in radio mode, the primary audio output of the phone 20 should be via the high volume speaker 85.

When the phone 20 is powered on, and at other appropriate subsequent times, the user may select the operating mode (e.g., phone or radio) via any method known in the art, such as via a selection menu displayed on the display 28. Alternatively, the phone may choose the operating mode without intervention of the user. For purposes herein, this selected operating mode is known as the default mode. The controller should keep track of the current default mode, such as by storing an indicator thereof in memory 24.

Typically, the user will operate the phone 20 in the default mode, participating one or more call sessions. However, as often arises, the user may wish to place a call in a particular mode. For instance, the user may wish to place a conference call to a number of locations and may wish the phone 20 to begin radio mode so as to minimize interference with the other participants. The present invention allows the user to do so without necessarily knowing the present operating mode of the phone 20. For this example, the user selects the appropriate conference call number via any known method (box 110), and then presses the PTT key 75 (box 120). Pressing the PTT key 75 (box 120) causes the controller 22 to assume radio mode as its operational mode. If the controller 22 is already in radio mode (box 130), then this assuming of radio mode means simply staying in radio mode. If instead, the controller 22 is not in radio mode (box 130), the controller 22 changes to radio mode (box 140). The controller 22 then initiates a call in radio mode (box 150). The controller stays in radio mode during the balance of the call session (box 160). Consistent with the discussion above, this means that the high volume speaker 85 is used as the primary audio output during the call and the user must press the PTT key 75 to activate the microphone 34. At the end of the call session (box 160) the controller 22 reverts to the default mode (box 190). This means, for instance, that the controller 22 changes to the phone mode if phone mode is the selected default mode, or the controller 22 stays in radio mode if radio mode is the selected default mode. Typically, the phone 20 will then enter a standby state, as is well known in the art. Thus, by simply pressing the PTT key 75 to originate a call (box 120), the user may be sure that the phone 20 will operate according to radio mode for that particular call but will revert to the selected default mode when the call ends (box 190).

Similarly, the user may place a phone mode call regardless of the current default mode by pressing the send key 70 (box 220). The user selects the appropriate destination number via any known method (box 110), and then presses the send key 70 (box 220). Pressing the send key 70 (box 220) causes the controller 22 to assume phone mode as its operational mode. If the controller 22 is already in phone mode (box 230), then this assuming of phone mode means simply staying in phone mode. If instead, the controller 22 is not in phone mode (box 230), the controller 22 changes to phone mode (box 240). The controller 22 then initiates a call in phone mode (box 250). The controller stays in phone mode during the balance of the call session (box 260). Consistent with the discussion above, this means that the low volume speaker 80 is used as the primary audio output during the call and the user need not press any key to activate the microphone 34. At the end of the call session (box 260) the controller 22 reverts to the default mode (box 190). This means, for instance, that the controller 22 changes to the radio mode if radio mode is the selected default mode, or the controller 22 stays in phone mode if phone mode is the selected default mode. Typically, the phone 20 will then enter a standby state, as is well known in the art. Thus, by simply pressing the send key 70 to originate a call (box 220), the user may be sure that the phone 22 will operate according to phone mode for that particular call but will revert to the selected default mode when the call ends (box 190).

Optionally, the display 28 may be used to display the current default mode and/or the current override mode if present. Thus, in case of problems, the user may easily determine which of the speakers 80,85 should be operating.

The discussion above has assumed that the phone includes at least two speakers 80,85. However, this is not required. In some embodiments, the phone includes only one speaker, for instance the speaker 80 located far from the microphone 34. As above, the speaker 80 operates under the control of the controller 22. However, the speaker 80 in such a situation would have at least two operating speaker modes, corresponding to phone mode and radio mode. In phone mode, the speaker 80 would have a maximum allowed audio volume that is relatively low (e.g. 18 dB), while in radio mode, the speaker 80 would have a maximum allowed audio volume that is relatively higher (e.g. 90 dB). Thus, while the actual speaker volume may vary depending on user controlled volume settings and the incoming signal, the speaker mode, and thus the maximum volume of the speaker 80, can be controlled depending on the operating mode of the phone 20.

It should be noted that the selection of the number to be called may be made in any fashion known in the art. For instance, the user may first input the number directly via the keypad 30 or by selecting a number stored in memory through a menu on the display 28. Alternatively, there may be a default number assigned to each key on the keypad, optionally including the send key 70 and the PTT key 75, to facilitate speed dialing.

Using the present invention, the user is supplied with a simple method of temporarily hot-switching to the desired mode of operation. If the user decides to place a radio mode call, the user may initiate the radio mode call by pressing the PTT key 75 without having to worry about the current mode of the phone 20. Conversely, if the user decides to place a phone mode call, the user may initiate the phone mode call by pressing the send key 70 without having to worry about the current mode of the phone 20. In either case, the phone 20 will revert to the default mode at the conclusion of the call. Thus, rather than having to navigate a complex menu system or press multiple keys, the user may temporarily change operating modes of the phone 20 and initiate a call through the simple press of a single key.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method of selecting between a plurality of speakers associated with a wireless communications device, said wireless communications device having a first speaker for radio mode operation having a higher maximum output and a second speaker for phone mode operation having a lower maximum output, the method comprising:
   a) selecting either radio mode or phone mode as a default operating mode for handling;
   b) thereafter, activating one of a first key and a second key to initiate a call session and in response thereto automatically activating an override mode and initiating said call session in said override mode, wherein said override mode is said radio mode if said first key is the key activated and wherein said override mode is said phone mode if said second key is the key activated;
   c) operating in said override mode until said call session ends and thereafter automatically reverting to said default operating mode;
   d) wherein the first speaker automatically acts as the wireless communications device's primary speaker in radio mode and wherein said second speaker automatically acts as the wireless communications device's primary speaker in phone mode.

2. The method of claim 1 wherein said call session ends with a call release.

3. The method of claim 1 wherein said activating one of said first key and said second key to initiate a call session includes pressing one of said first key and said second key.

4. The method of claim 1 wherein said first key is a push-to-talk key for radio mode operation.

5. The method of claim 1 wherein said second key is a send key for phone mode operation.

6. The method of claim 1 wherein said wireless communications device includes a display and wherein said display provides an indication of which operating mode the wireless communications device is currently in.

7. The method of claim 1 wherein said wireless communications device is a cellular telephone.

8. The method of claim 1 wherein the maximum output of said first speaker is more than 75 dB and wherein the maximum output of said second speaker is less than 20 dB.

9. The method of claim 1 wherein both said default operating mode and said override mode are the same for at least one communications session and not the same for at least one other communications session.

10. A multiple mode wireless communications device, comprising:
    a) a receiver for receiving communications signals from a remote location;
    b) a first speaker for outputting audio sounds based on said received communications signals;
    c) a second speaker for outputting audio sounds based on said received communications signals; said first speaker having a higher maximum output and said second speaker having a lower maximum output;
    d) a first key and a second key;
    e) a controller communicating with said receiver, said first key, said second key, and said speakers and operating according to a default mode;
    f) wherein, if a user presses either said first key or said second key to initiate a call session, said controller automatically assumes an override mode and operates in said override mode until said call session ends,
       i) wherein said override mode is radio mode if said first key is the key pressed, and
       ii) wherein said override mode is phone mode if said second key is the key pressed;
    g) wherein said controller automatically reverts to said default operating mode upon the end of said call session; and
    h) wherein the first speaker automatically acts as the wireless communications device's primary speaker in radio mode and wherein said second speaker automatically acts as the wireless communications device's primary speaker in phone mode.

11. The wireless communications device of claim 10 wherein said call session ends with a call release.

12. The wireless communications device of claim 10 wherein said first key is a push-to-talk key.

13. The wireless communications device of claim 10 wherein the first speaker automatically acts as the wireless communications device's only speaker in radio mode and wherein said second speaker automatically acts as the wireless communications device's only speaker in phone mode.

14. The wireless communications device of claim 10 further including a display in communication with said controller, said display providing an indication of which operating mode the wireless communications device is currently in.

15. The wireless communications device of claim 10 wherein said wireless communications device is a cellular telephone.

16. A method of selecting between a plurality of modes for audio electronics associated with a wireless communications device, said audio electronics including a controller and at least one speaker and having a variable maximum allowed audio output, comprising:
    a) selecting either radio mode or phone mode as a default operating mode and operating said audio electronics according to said default mode;
    b) thereafter, pressing one of a first key and a second key to initiate a call session and in response thereto automatically activating an override mode and initiating said call session in said override mode, wherein said override mode is said radio mode if said first key is the key pressed and wherein said override mode is said phone mode if said second key is the key pressed;
    c) operating said audio electronics according to said override mode until said call session ends and thereafter automatically reverting to said default operating mode; and d) wherein said audio electronics has a lower maximum allowed audio output in phone mode than in said radio mode.

17. The method of claim 16 wherein the maximum allowed audio output of said speaker is more than 70 dB in said radio mode and limited to less than 20 dB in said phone mode.

18. The method of claim 16 wherein said first key is a push-to-talk key for radio mode operation.

19. The method of claim 16 wherein said wireless communications device includes a display and wherein said display provides an indication of which operating mode the wireless communications device is currently in.

20. The method of claim 16 wherein said audio electronics includes a first speaker and a second speaker and wherein said audio electronics generates audio output primarily at said first speaker in radio mode and primarily at said second speaker in phone mode.

* * * * *